United States Patent [19]
Weingartner et al.

[11] Patent Number: 5,477,572
[45] Date of Patent: Dec. 26, 1995

[54] VEHICLE SEAT CUSHION

[75] Inventors: Rudolf Weingartner, Neuhofen a.d. Krems; Johann Möseneder, Grieskirchen, both of Austria

[73] Assignee: C.A. Greiner & Söhne Gesellschaft m.b.H., Kremsmünster, Austria

[21] Appl. No.: 131,709

[22] Filed: Oct. 5, 1993

Related U.S. Application Data

[62] Division of Ser. No. 870,959, Apr. 20, 1992, Pat. No. 5,283,918.

[30] Foreign Application Priority Data

Apr. 22, 1991 [AT] Austria ................................. A832/91
Oct. 11, 1991 [AT] Austria ................................. A2031/91

[51] Int. Cl.$^6$ .............................. A47C 27/00; B32B 7/00
[52] U.S. Cl. .................... 5/459; 5/481; 297/DIG. 5; 428/247; 428/257; 428/258; 428/259; 428/902; 428/920
[58] Field of Search .................... 5/481, 459, 470, 5/473; 428/247, 257, 258, 259, 902, 920; 297/DIG. 5

[56] References Cited

U.S. PATENT DOCUMENTS

| | | | |
|---|---|---|---|
| 3,806,959 | 4/1974 | Gross | 297/DIG. 5 |
| 4,092,752 | 6/1978 | Dougan | 5/459 |
| 4,463,465 | 8/1984 | Parker | 5/459 |
| 4,736,901 | 4/1988 | Heitmann | 5/459 |
| 4,983,433 | 1/1991 | Shirasaki | 428/258 |
| 5,151,316 | 9/1992 | Dorkin | 428/247 |

FOREIGN PATENT DOCUMENTS

| | | |
|---|---|---|
| 73118 | 9/1983 | European Pat. Off. . |
| 1779082 | 12/1971 | Germany . |
| 3311053 | 9/1984 | Germany . |
| 3512790 | 10/1986 | Germany . |
| 249630 | 9/1987 | U.S.S.R. ............. 297/DIG. 5 |
| 1427619 | 3/1976 | United Kingdom ........... 5/481 |
| 8801939 | 3/1988 | WIPO ..................... 428/258 |

*Primary Examiner*—Flemming Saether
*Attorney, Agent, or Firm*—Collard & Roe

[57] ABSTRACT

A seat cushion comprises a supporting body of an open-celled, resilient foamed plastic material, an outer flame-resistant covering material encasing at least portions of the seat cushion, and a flame-resistant protective layer encasing the supporting body and connected thereto, the protective layer underlying the covering material and consisting of machine-knitted, multi-layered material. This protective layer material comprises warp threads arranged in two superposed planes and spaced apart a predetermined distance, the warp threads in an upper one of the planes being staggered in a woof direction by half the predetermined distance from the warp threads in a lower one of the planes, and the warp threads extending in a longitudinal direction, and a group of eight weft threads adjacent each other in the longitudinal direction. Two of the eight weft threads are looped around each warp thread in the upper plane, a respective one of the two weft threads is additionally looped around alternating ones of the wrap threads in the lower plane, three of the six additional weft threads are arranged between the two weft threads and are looped around different warp threads arranged only in one of the two planes, and each warp thread in each plane is looped around by only three weft threads.

21 Claims, 10 Drawing Sheets

VEHICLE SEAT CUSHION

CROSS-REFERENCE TO RELATED APPLICATION

This is a division of our U.S. patent application Ser. No. 07/870,959, filed Apr. 20, 1992, now U.S. Pat. No. 5,283,918.

BACKGROUND OF THE INVENTION

1. Field of the Invention

The invention relates to a seat cushion, in particular for an aircraft seat, of the type comprising a supporting body of a framed plastic having a spring core embedded therein and a flameproofing layer of flame-retardant plastic foam to which a covering material is connected, preferably detachably.

2. Description of the Prior Art

A known seat with a cushion of foamed plastic—described for example in published PCT application WO87/06894 application of C. A. Greiner & Söhne GmbH—comprises a foamed plastic with a support body of an open-celled, resilient plastic foam having a first density and a flameproof layer of an open-celled resilient foamed plastic, provided with a flameproofing agent, having a second density which is different from said first density. The plastic foam and the flameproof layer are connected with each other, in particular through a foaming process, and are surrounded by a flame-resistant covering material. In order to achieve a sufficient permeability to air on the part of such a cushion, it has also been proposed, after the completion of the cushion, to push heated needles through, so that a corresponding exchange of air is possible. These cushions have proved to be very successful in practice; however, it has been found that, especially in extreme weather conditions, or under various climatic conditions, the sitting comfort of the seats for the planned usage in vehicles was not sufficient.

In addition, seats for public transport are also known—as disclosed in German Utility model 85 06 816—which have a seat cushion, which is covered with a seat cover, in which the seat cover and the seat cushion consist of a flame-resistant and low-smoking material. Between the flame-resistant seat cover and the seat cushion, mostly consisting of plastic foam, there is often arranged a glass fiber mat which is intended to prevent the seat cover from burning through in the direction of the seat cushion. However, it has been found here that in many cases, the action of the flames arises from the direction of the floor and the plastic foam of the seat cushion tends to burn, with an intensive generation of smoke, whereby in the case of fire, the vehicle is so full of smoke in the shortest period of time that it is scarcely possible for the occupants to find their bearings. Accordingly, in the case of this known seat, provision is made that beneath the seat cushion in the supporting frame of the seat, a fire-resistant plate is arranged. This requires the use of a special section for mounting the seat padding and also requires an additional expenditure through the arrangement of the fire-resistant plate. In this embodiment, the ventilation of the seat was not satisfactory, either.

Seats with cushions of foam plastic are very widely used in modern vehicle construction. They are used above all in rail and road vehicles, but also to a predominant extent in aircraft. Whilst the regulations applicable to rail vehicles with regard to the self-extinguishing construction of the materials which are used, or respectively the generation of smoke, prescribe very strict guiding principles, the regulations applicable in the aircraft industry are even more stringent. Thus, a test is prescribed in the case of seats permitted for use in aircraft, in which the cushions, in their composition as provided for installation, are directly exposed to a flame from a burner. This flame acts over a period of 2 minutes directly onto the cushion, after which the flame is extinguished or removed. The cushion is extinguished after 5 minutes, if the flames have not extinguished themselves by that time. After this fire test, the weight loss of the cushion must not be higher than 10%. In order to fulfil these extremely strict regulations, and at the same time also achieve a high degree of sitting comfort in the seats in the case of flights of long duration and to achieve a low weight, seat cushions of various open-celled, elastic soft foam plastics, provided with flameproofing agent and having differing densities, are stuck together.

Such a known vehicle seat—as described in European specification A1 190 064—comprises several layers of needle fleece, which are surrounded by a flameproof covering material. Between the covering material and the individual layers of needle fleece, to reduce damage by vandals, reinforcement mats of metal or glass fibers are arranged. Through the sticking of the individual layers and the many intermediate layers of this vandal-proof layer, sufficient ventilation is still difficult to achieve in the known vehicle seat.

In another known seat for aircraft, in order to produce the complicated three-dimensional fashioning of the seat cushions more simply, the supporting body is formed from a part which is foamed in one piece in a mould and is mixed with flameproofing agents, the surface of which is covered with a flameproofing layer and thereafter with a flameproof covering material. With the known seats, however, the new increased safety specifications and testing regulations for aircraft seats could not be fulfilled.

SUMMARY OF THE INVENTION

It is an object of the present invention to provide a seat cushion which deals with the extraordinary stresses of seat cushions, in particular in public transport, especially aircraft seats, and with a long durability to facilitate maintenance, in particular keeping such seat cushions clean. It is a further object of the invention to provide a seat cushion which is comfortable to sit on even over a lengthy period of use. It is a still further object of the invention to provide a seat cushion which exhibits a high resistance to fire and also a long duration of use without destroying the material protective layer.

These objects are achieved in accordance with the invention with a seat cushion comprising a supporting body of an open-celled, resilient foamed plastic material, an outer flame-resistant covering material encasing at least portions of the seat cushion, and a flame-resistant protective layer encasing the supporting body and connected thereto, the protective layer underlying the covering material and consisting of machine-knitted, multi-layered material. This protective layer material comprises warp threads arranged in two superposed planes and spaced apart a predetermined distance, the warp threads in an upper one of the planes being staggered in a woof direction by half the predetermined distance from the warp threads in a lower one of the planes, and the warp threads extending in a longitudinal direction, and a group of eight weft threads adjacent each other in the longitudinal direction. Two of the eight weft threads are looped around each warp thread in the upper plane, a respective one of the two weft threads is additionally looped around alternating ones of the wrap threads in the lower plane, three of the six additional weft threads are arranged between the two weft threads and are looped around different warp threads arranged only in one of the two planes, and each warp thread in each plane is looped around by only three weft threads. The surprising advantage of this solution, which appears to be relatively simple, lies in that with the utilisation of the inherent elasticity of the supporting body, comprising a foamed plastic, in combination with the specifically constructed material and its high elasticity, a high restoring capability is achieved in the case of stresses occurring through the action of forces or acting on the seat cushion. At the same time, this prestressing existing through the foam material of the supporting body keeps taut the material protective layer, which in itself is elastic, and in connection with the processing, avoids the creasing which otherwise usually occurs in such material protective layers. Through the fact that this creasing can be eliminated, it is, however, now possible in turn to use in such covering materials high-strength fibers, which are sensitive to breaking in the case of creasing, such as for example polyamide fibers, particularly polyaromatic amide fibers, and preoxidised polyacrylonitrile fibers. On the other hand, however, folds are also prevented from remaining in the material of the protective layer through overstretching of the material of the protective layer at a point, because through adhesively bonding the material of protective layer to the supporting body as far as possible over the whole surface or over a large part of the surface, the maximum expansions between the individual attachment sites in the sense of adhesion sites are kept small and consequently such excess stresses are likewise reliably avoided. A further advantage of the material of the protective layer used lies in the high density and in the high cutting resistance owing to the arrangement of the warp threads in several layers in at least two planes lying one over the other. Thereby, both a high mechanical resistance strength and also a high flame resistance or favourable burning properties are achieved.

In a preferred embodiment, a first one of the three weft threads adjacent one of the two weft threads is looped around the warp threads in the lower plane around which the one weft thread is not looped, a second one of the three weft threads adjacent the first weft thread is looped around only those warp threads in the lower plane around which the one weft thread is looped, a third one of the three weft threads adjacent the second weft thread is looped around only alternating ones of the warp threads in the upper plane, a fourth one of the six additional weft threads adjacent the other one of the two weft threads is looped around the warp threads in the lower plane around which the other weft thread is not looped, a fifth one of the six additional weft threads adjacent the fourth weft thread is looped around only those warp threads in the lower plane around which the other weft thread is looped, and a sixth one of the six additional weft threads adjacent the fifth weft thread is looped around only alternating ones of the warp threads in the upper plane. The required elasticity in the material of the protective layer can thus be achieved in that a quite rigidly interlinked layer of warp and weft threads is connected via parts of these weft threads, which are displaceable three-dimensionally, with a material layer of warp and weft threads, having a higher elasticity, in the lower plane, so that despite a high wear resistance in the upper layer, sufficient elasticity with respect to the supporting body is achieved and hence also tearing of the foam plastic out of the supporting body can be prevented through a uniform distribution of the stresses which are introduced.

The weft threads which loop around the warp threads of the individual planes preferably run between the warp threads arranged between the two planes to give a smooth knitted pattern, which prevents individual weft threads with a lower prestressing from protruding above the surface of the material and hence catching or hanging on the seat surface. Thereby the weft threads can be prevented from being torn off or worn more intensively, whereby the wear resistance and the durability of such a seat cushion is further increased.

Preferably, the lower plane of the protective layer material faces the supporting body. This achieves a distribution of concentrated loads acting on the material protective layer over a greater area, whereby the overall loading of the supporting body is reduced in closely delimited areas.

At least some individual warp and/or weft threads are preferably made of polyamide fibers, polyaromatic amide fibers preferably of $\frac{1}{56}$ metergauge, offering a considerable increase in strength, without impairing the seat or its comfort during use, or the durability of the seat cushion.

The warp and/or weft threads are preferably provided with a coating of synthetic resin material, such as polyvinylchloride (PVC) or polyurethane (PU) so as to render the protective layer dirt-repellent, as is important in particular when used in long-haul aircraft wherein seats are much affected by bodily perspiration and bodily secretions.

An extremely resistant development of the seat cushion is achieved if at least a portion of the warp and weft threads comprise preoxidised polyacrylonitrile and another portion thereof comprise polyaromatic amide, the content of polyaromatic amide fibers being preferably 30% and the content of preoxidised polyacrylonitrile fibers 70%. The advantage is that such fibers have a high temperature resistance with a low gas emission and at the same time combine this advantage with the advantage of a high tensile, elasticity, so that such a material protective layer not only has a protective wall against temperature influences but also at the same time against mechanical damage and stresses.

The warp and/or weft threads preferably have a slight twist so that the elasticity of the individual threads from which the material protective layer is produced is higher and consequently damping properties are achieved.

The warp and/or weft threads are preferably prestressed and fixed thus by means of adhesive in the supporting body. In this way, slack portions and excessive stretching in individual regions of the material protective layer can be prevented.

In another preferred embodiment, the supporting body is foamed onto the surface of the protective layer facing away from a surface facing the user, if necessary with the interposition of a fluid-tight film coated onto the material protective layer, and is connected therewith by the foaming process. In this way, manufacturing time and hence the cost of production are reduced and the handling of the individual parts is simplified.

The material of the protective layer provided on the surface of the cushion facing the user is preferably attached to the supporting body by a layer of adhesive which is preferably air-permeable to enhance ventilation and comfort.

A flameproofing layer is preferably arranged between the material protective layer and the supporting body, comprising an open-celled resilient foamed plastic, with a density different from that of the supporting body, to enhance the flame resistance and the fire bearing capacity of the seat. This layer is preferably coated on the surface of the material protective layer facing the supporting body, to reduce the thickness of the fireproofing layer and improve comfort.

BRIEF DESCRIPTION OF THE DRAWINGS

Further objects and advantages of the invention will become apparent from the following detailed description when read in conjunction with the accompanying drawings which illustrate preferred embodiments thereof.

In the drawings.

DETAILED DESCRIPTION OF THE PREFERRED EMBODIMENTS

Figure 1:
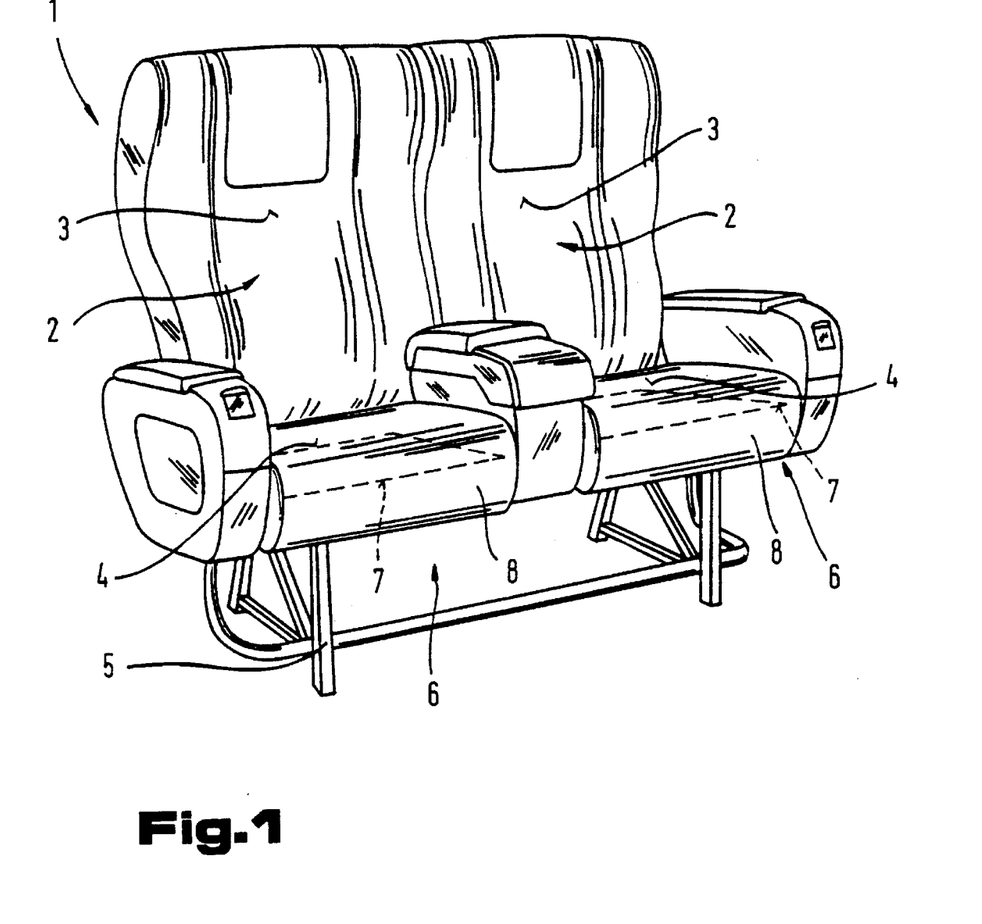
FIG. 1 shows a double bench seat for an aircraft, with seat cushions according to the invention and with back rests.

Referring first to FIG. 1, a double bench aircraft seat 1 with two seats 2 is illustrated. Each of the seats 2 comprises a back rest 3 and a seat cushion 4. The cushions 4 are identical in construction. The back rest 3 and the seat cushion 4 are placed into a supporting frame 5, which may also have any other desired shape.

As indicated schematically, the seat cushion 4 has a supporting body 6, which is formed from a supporting part 7 and a sitting part 8.

Figure 2:
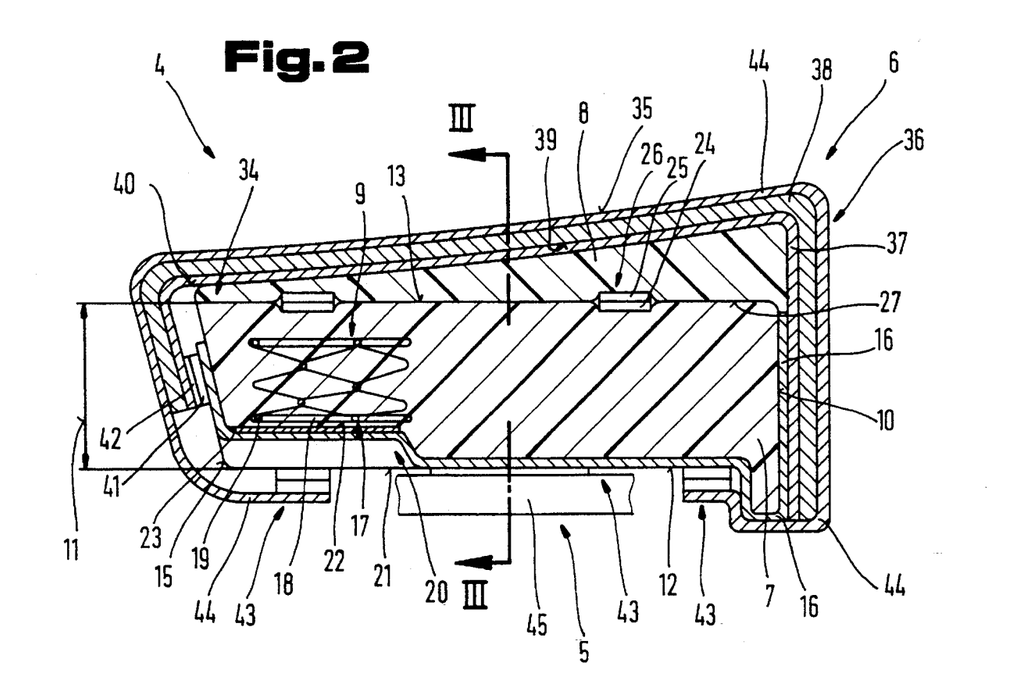
FIG. 2 shows a seat cushion according to a first embodiment of the invention, comprising a sitting part and supporting part, in side view, in cross section along the line II—II in FIG. 3.
Figure 3:
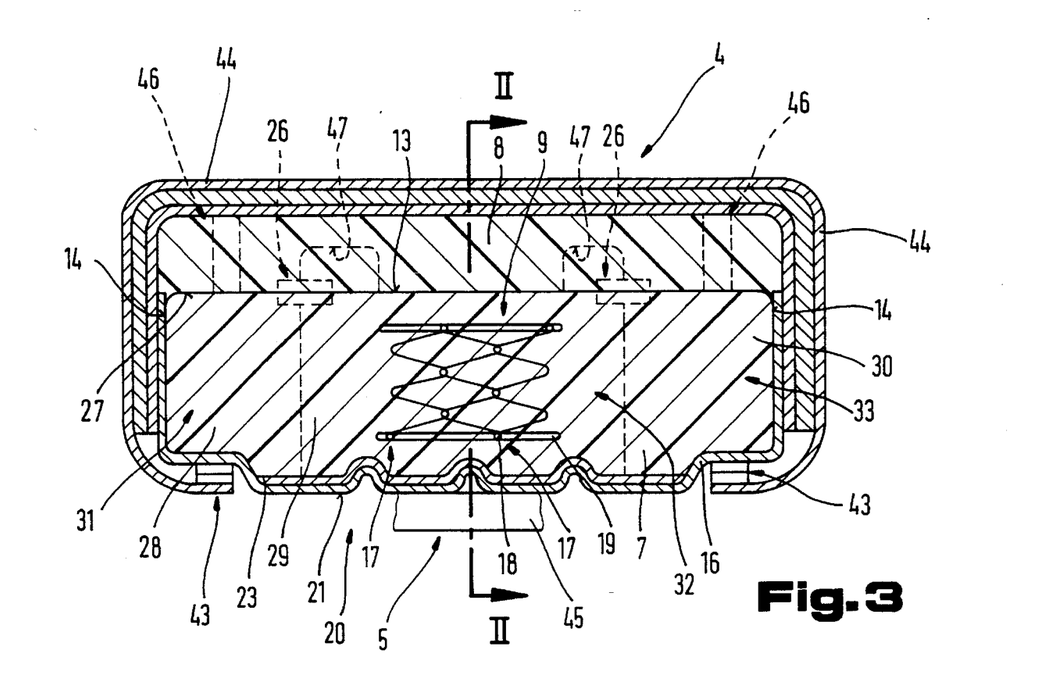
FIG. 3 shows the seat cushion according to the invention in front view, in cross section, along the line III—III in FIG. 2.
Figure 4:
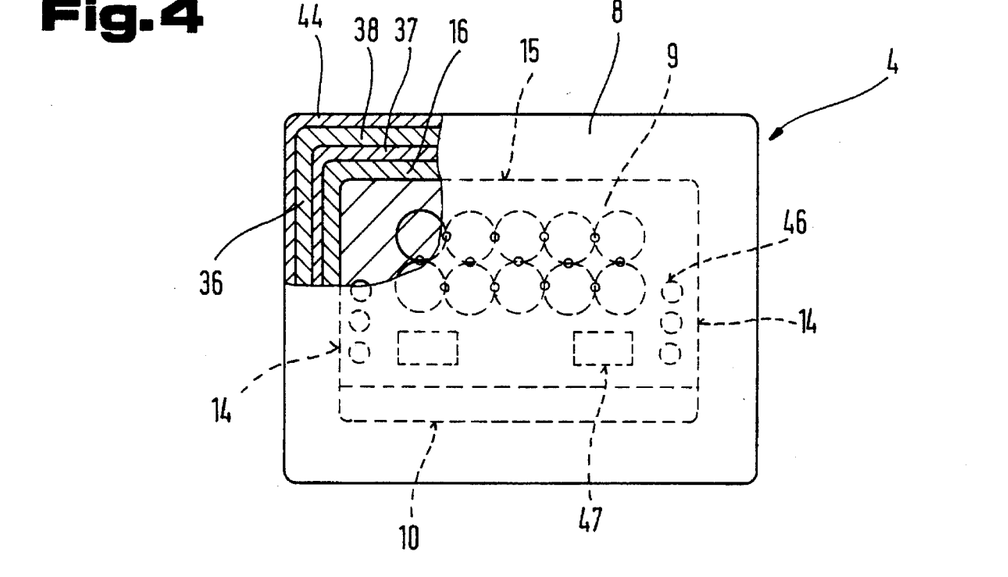
FIG. 4 shows a supporting part of the seat cushion of FIGS. 2 and 3, in plan view.

As can be seen in further detail from FIGS. 2 to 4, a spring core 9 is embedded in the supporting part 7. This spring core lies in a rear half of the seat cushion 4, facing away from an end 10, and extends almost over a full thickness 11 of the supporting part 7, i.e. from an underside 12 to a bearing face 13. The underside 12, lateral edges 14 and a rear end edge 15 are encased by a covering material 16, which also extends over the front edge 10. Consequently, only the bearing surface 13 remains without covering by the covering material 16.

As can be further seen from the illustration, in particular in FIG. 2, node points 17 of longitudinal and transverse wires 18, 19 are arranged in the region of grooves 20 in the underside 12 of the supporting part 7. Consequently, the projections 21 lying between the grooves 20 project over a lower bearing face 22 of the spring core 9 so that, when the seat cushion 4 lies on a flat-surfaced supporting frame 5, premature destruction of the covering material 16 by the node points 17 cannot occur and in these regions a longer lifespan of the covering material 16 is achieved.

In addition, it is also possible, for example at least between the bearing face 22 of the spring core 9 and the underside 12 and the covering material 16 arranged thereon, to arrange an intermediate layer 23 of high-strength fibers or threads in the manner of a knitted fabric, net, lattice or the like, which may consist of metal, carbon, plastics, ceramics or the like and additionally or at the same time may also be resistant to high temperatures. This intermediate layer 23 furthermore may also if desired, extend over the front end surface 10, the lateral edges 14 and the rear end surface 15, i.e. over the entire surface with the exception of the bearing face 13.

On the bearing face 13 of the supporting part 7, furthermore, burred tapes 24 are arranged, which cooperate with mating burred tapes 25 of burred closures 26, which are arranged on the bearing face 27 of the sitting part 8, lying opposite the bearing face 13. These burred closures 26 serve to attach the sitting part 8 on the supporting part 7 in a detachable manner.

The supporting part 7 may be produced in one piece from a foamed plastic. This plastics foam may be open-celled, and may, moreover, have different elasticity values—adapted to the respective case of usage.

In a modification of this embodiment shown in FIG. 3, it is possible to compose the supporting part, as shown by vertical broken lines, from several layers 28, 29, 30 of different foamed plastics 31, 32, 33.

The spring core 9 is incorporated into the supporting part 7 during foaming. Here, it is possible to prestress the spring core 9 in the foaming mould for the supporting part 7, i.e. to give a higher elastic force in accordance with the physical properties of springs and to achieve a corresponding spring behaviour with the use of a smaller wire thickness of the springs. This makes it possible to keep the weight of the spring core 9, and thus of the supporting part 7, low.

The sitting part 8 is formed from a foamed plastic 34 and tapered so as to become narrower from the end edge 10 in the direction of the end edge 15. Advantageously but not necessarily, the foamed plastic of the sitting part has a lower density than that of the supporting part 7. The sitting part 8 is enveloped by a flameproofing layer 36 on an upper side 35 and in the direction of the supporting part 7 projecting beyond the bearing face 27 of the sitting part 8. The sitting part 8 may also be provided with an intermediate layer 37, which is arranged between a flameproofing layer 36, formed from a flame-retardant, open-celled foamed plastic 38 and the foamed plastic 34 of sitting part 8. This intermediate layer 37 may be formed, like the intermediate layer 23, from high-strength fibers or threads in the manner of a knitted fabric, net, lattice or the like, which may consist of metal, carbon, plastics, ceramics or the like or of any desired combinations thereof and additionally or at the same time may also be resistant to high temperatures. If the intermediate layer 37 is arranged, it is preferably formed by fibers or threads of carbon, metal, polyester, aramid fibers such as Kevlar®, ceramics, polytetrafluoroethylene such as Teflon® or other plastics resistant to high-temperatures, which is arranged on the surface 39, facing the foamed plastic 34 of the sitting part 8, of the foamed plastic 38 forming the flameproofing layer 36, and preferably is stuck thereto. The flameproofing layer 36 formed by the plastics foam 38 and intermediate layer 37 is connected with a connecting face 40, facing the upper side 35. It maybe stuck thereto or is foamed thereon or on a fluid-tight barrier film which is connected with the flameproofing layer 36.

The regions of the flameproofing layer 36 and intermediate 37, projecting beyond the bearing faces 13 and 27, overlap with the end surfaces 10, 15 and the lateral edges 14 of the supporting part 7. They are preferably attached with burred tapes 41, 42 arranged in the overlapping region on the supporting part 7 to the covering material 16 of the supporting part 7 and the flameproofing layer 36 or, if provided, the intermediate layer 37. Thereby, the end surfaces 10, 15 and lateral edges 14 are covered approximately up to the region of the underside 12 by the flameproofing layer 36. On the underside 12 of the supporting part 7 or of the covering material 16 arranged on the supporting part 7, burred tape arrangements 43 are arranged for the attachment of a preferably flame-resistant covering material 44, surrounding the sitting part 8 and the supporting part 7 up to the region of its underside 12. An attachment of the seat cushion 4 on a frame part 45 of the supporting frame 5 of the double bench seat 1 is likewise possible by means of burred tape arrangements 43.

As illustrated with broken lines in FIG. 2, it is possible, preferably in the plastics foam 34 of sitting part 8, to provide perforations 46 or cavities 47 in seat cushion 4. Through these perforations 46 or cavities 47 it is possible to create in the sitting part 8 or in the supporting part 7 different zones of elasticity, which take into account the different loads or the sitting comfort. In addition, these perforations 46 or cavities 47 bring about an improved ventilation in the regions immediately adjoining the upper side of the seat 2, which has an advantageous effect in the use of these seats in the case of greatly varying conditions and also in the case of contact over a lengthy period of time, e.g. in long-haul flights.

Figure 5:
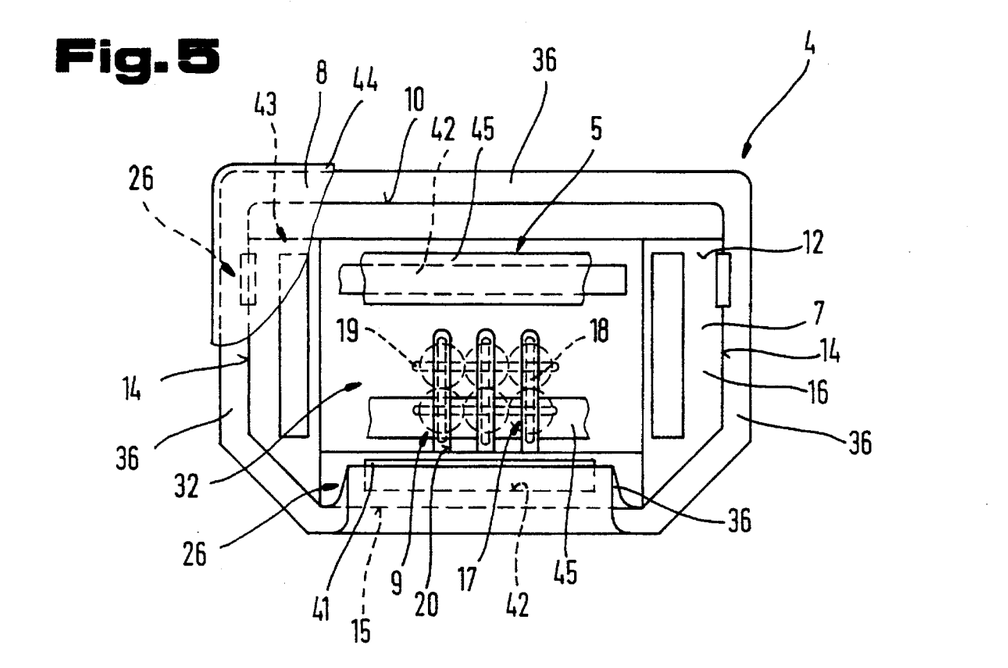
FIG. 5 shows a supporting part of a seat cushion of FIGS. 2 to 4, in a view from below with the burred tapes of a burred closure arranged thereon.

In FIG. 5, the seat cushion 4 is shown with the supporting part 7 and the sitting part 8 in a view from below, in which the same reference numbers are used for the same parts. The supporting part 7 is overlapped on the end surface 10 and 15 and the lateral edges 14 by the flameproofing layer 36 in the direction of the underside 12. In the region of the rear end face 14, the flameproofing layer 36 overlaps the underside 12 of the supporting part 7 in the direction of the front end edge 10. In this region, on the covering material 16 forming the underside 12 of the supporting part 7, the burred tape 41 is arranged, e.g. through sticking, welding, etc., and forms there, with the burred tape 42 which is arranged on the flameproofing layer 36, the burred closure 26 for the attachment of the sitting part 8 in the region of the rear end face 15 on the supporting part 7. As additionally drawn with in broken lines, it is also possible to arrange burred closures 26 in the region of the lateral edges 14 between the supporting part 7 and the sitting part 8 for the fixing of the flameproofing layer 36 projecting over the supporting part 7 in the region of the lateral edges 14.

Approximately in the rear third of the supporting part 7, spring core 9 is formed in the foamed plastic 32 of the supporting part 7. In the region of the node points 17 between the longitudinal wire 18 and the transverse wire 19 of the spring core 9, the grooves 20 are arranged, which produce depressions in relation to the underside 12. Thereby, the regions associated with the grooves 20 are spaced from frame part 45, whereby the risk of damage or chafing of the covering material 16 is prevented.

It can be seen in addition that on the underside 12, the burred tape arrangements 43 are arranged for the attachment of the covering material 44 covering the upper side 35 of the seat cushion 4, which covering material extends into the region of the underside 12. Further burred tapes 42 serve for the fixing of the seat cushion 5 onto the frame parts 45 of the supporting frame 6.

This embodiment of the seat cushion 4 with its supporting part 7 and the sitting part 8 presents great advantages with regard to the continuous maintenance of these highly stressed seats, because the individual elements are able to be rapidly exchanged in the case of damage, and as in addition it does not represent any great expenditure to carry out cleaning in particular of the sitting part 8 at short intervals. The exchanging only requires a small expenditure of time and no specialist personnel, and in addition no tools are necessary. In addition to this, the sitting parts 8, which are subject to a higher degree of wear, can be exchanged whilst retaining the supporting part 7 and consequently the overall costs for the seat cushions can be reduced over the lifespan of an aircraft. This division of the seat cushion 4 into sitting part 8 and the supporting part 7 also brings advantages in that for example the supporting part 7 can be produced in very high quantities in industrial manufacture in series, and then, depending on the intended use, provided with a sitting part 8 designed for the desired type of seat cushion 4.

Figure 6:
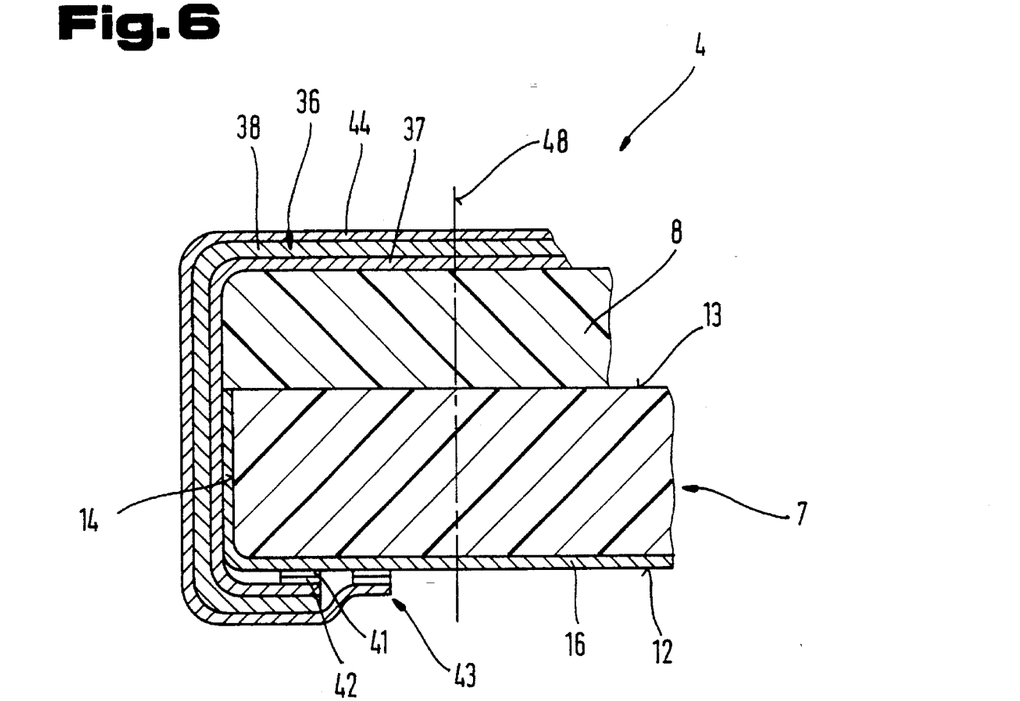
FIG. 6 shows from the front a vertical cross section of a seat cushion according to a second embodiment of the invention with parts of the fireproofing layer overlapping the supporting part.

In FIG. 6, another embodiment of the seat cushion 4 is shown, formed from the supporting part 7 and the sitting part 8, in which the same reference numbers are used for the same parts as in the preceding figures. the sitting part 8 has the flameproofing layer 36, which overlaps the supporting part up to the region of the underside 12, in which burred tapes 41 are attached, for example stuck on, welded on, etc., on the underside 12 or on the material 16 covering the underside 12, which burred tapes 41 cooperate with burred tapes 42 which are arranged on the flameproofing layer 36. Thereby it is ensured that the flameproofing layer overlaps the supporting part 7 up to the region of the underside 12 and thereby no openings arise on the lateral edges 14 or end surfaces 10, 15, whereby also in these regions penetration of flames in the case of fire is effectively prevented. The flameproofing layer 36 is additionally covered by the covering material 44, which is attached via the burred tape arrangements 43, which are likewise arranged on the underside 12 adjacent the burred tapes 41, 42 in the direction of a central axis 48.

Figure 7:
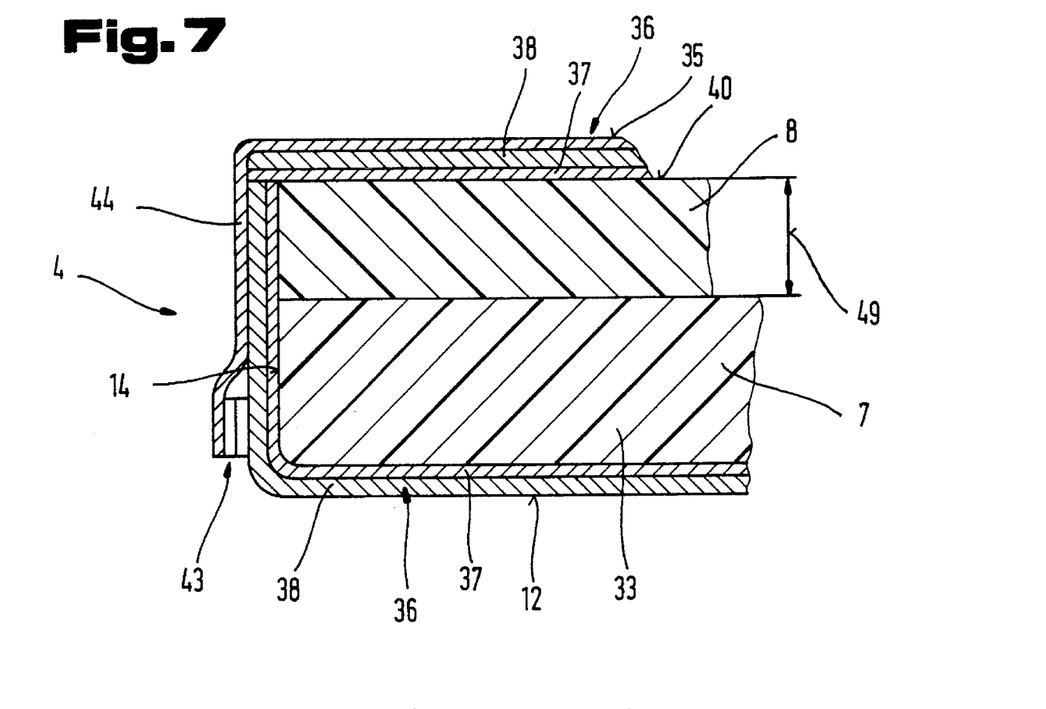
FIG. 7 shows from the front a vertical cross section of a seat cushion according to a third embodiment of the invention, with parts of the covering material, projecting over the bearing surface of the supporting part in the direction of the sitting part, or respectively of the fireproofing and/or intermediate layer.

In FIG. 7 another embodiment of the seat cushion 4 is shown, in which the same reference numbers are used for the same parts as in the preceding figures. In this embodiment, the supporting part 7 is provided on the underside 12 with the flameproofing layer 36, e.g. the flame retardant foamed plastic 38 and the intermediate layer 37 associated with the foamed plastic 33 of the supporting part 7, which intermediate layer projects over the lateral edges 14, and end surfaces 10, 15 beyond the supporting part 7 by a distance corresponding to thickness 49 of the sitting part 8 in the direction of the upper side 35. The sitting part 8 has on its connecting face 40 facing the upper side 35 the intermediate layer 37 and the flameproofing layer 36 formed from the flame retardant foamed plastic 38, ending at the lateral edges 14 and end surfaces 10, 15 corresponding to the external outline of the supporting part 7. The covering material 44 arranged on the upper side 35 of the supporting part 8 overlaps the sides 14 and end surfaces 10, 15, in the direction of the underside 12 of the supporting part 7 and is attached to the supporting part 7 by means of the burred tape arrangements 43 arranged on the lateral sides 14 and end surfaces 10, 15.

This embodiment makes possible an exchange of the sitting part, in which through the burred tape arrangements 43 in the region of the lateral sides 14 and end surfaces 10, 15 a rapid dismantling is made possible because the regions of the underside 12, to which access is difficult, do not have any fixing devices or burred tape arrangements 43 for the covering material 44. Furthermore, in this embodiment, it is possible to dispense with additional fixing arrangements between the supporting part 7 and the sitting part 8 and to undertake the attachment of these elements to each other through the covering material 44, overlapping into the region of the underside 12, with the burred tape arrangements 43. Thereby, a further simplification in the manufacture of the seat cushion 4 is achieved, whereby this represents a very favourable solution with regard to cost.

Finally, the arrangement of the spring core is not of course bound to the position illustrated in the figures, but the core may be provided in any desired region of the supporting part, if necessary also with different vertical or strength factors or elastic forces, distributed over the cross-section. Furthermore, the embodiment of the individual layers, the use of the various raw materials for the plastics foams and the like may be modified as desired, in order to match them to the various requirements.

The supporting body 6, which is formed from the supporting part 7 and the sitting part 8, may preferably be formed from the underside 12 in the direction of the upper side 35 from foamed plastics with differing density, in which, preferably, in the direction of the upper side 35, the foamed plastic has a lower density. Generally the preferred density of the foam used for the supporting body 6 is 20 kg/m$^3$ to 80 kg/m$^3$. The flameproofing layer 36 may be formed, by the flame-retardant foamed plastic 38, the intermediate layer 37 and the flame-retardant covering material 16, 44, or only by a flame-retardant covering material 44, or flame-retardant covering materials 36, 44 in combination with the intermediate layer 37 comprising high temperature resistant fibers or threads. This flameproofing layer 36 may be arranged on the supporting part 7 and/or the sitting part 8.

Figure 8:
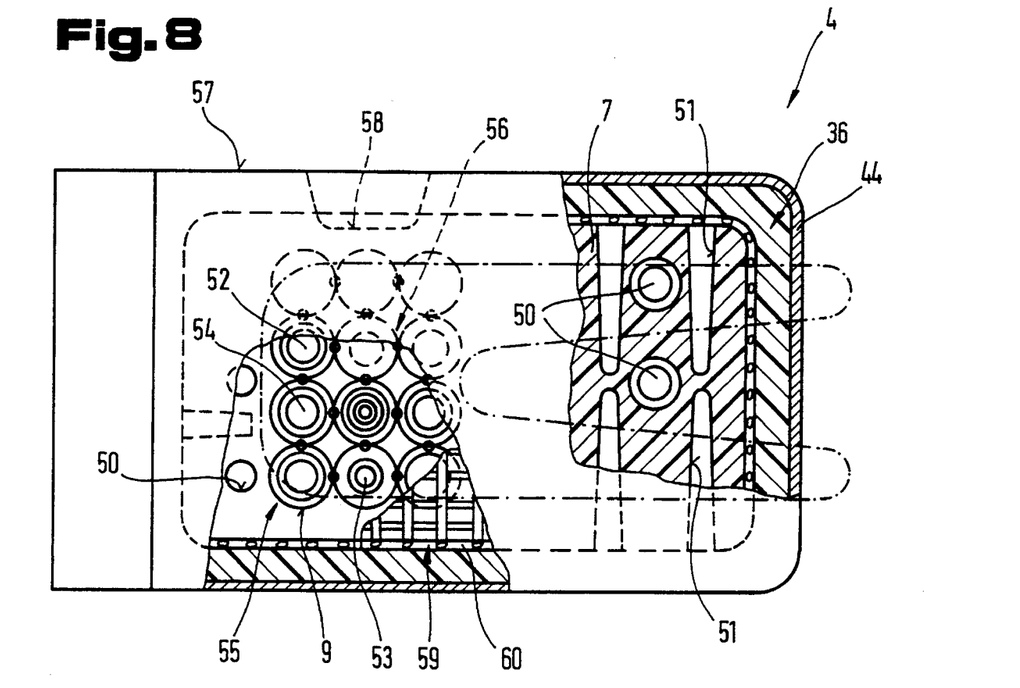
FIG. 8 shows a seat cushion in accordance with a fourth embodiment, in a view from below, partially in section.

In FIG. 8, which shows a bottom view of the seat cushion 4—in which the same reference numbers were used in turn for the same parts—, a possible distribution of recesses 50, 51, 52, 53, 54 is illustrated, in combination with a supporting device 55, which is formed by the spring core 9. From this illustration, it can be seen that in addition to the reinforcement of a central sitting surface 56, achieved by the spring core 9, which surface 56, as indicated with dot-and-dash lines, is formed by the bottom and the side of the upper thighs facing the seat cushion 4, the number of recesses 50 to 54 is greater than in the remaining regions. Thus, in these regions which are affected most strongly both by bodily perspirations and from the point of view of weight, a corresponding exchange of air is achieved and, through also using the supporting device 55, a long lifespan of the seat cushion 4 is achieved. At the same time, however, a reduction in weight of the seat cushion 4 is achieved, because in the region in which the spring core 9 is arranged, through the greater number of recesses 50 to 54, weight is saved in the supporting part 7 of plastics foam. If this saving in weight is not sufficient to take up the excess weight of the spring core 9, then for example recesses 58 may also be provided in lateral faces 57, which then serve principally for weight reduction and only bring immaterial improvements to the "sitting climate" of such a seat cushion 4.

Of course a spring core 9 or a correspondingly constructed supporting device 55 can also be used in those seats in which an intermediate layer 59 is formed by a moisture- or fluid-tight barrier film 60. In this case, through suitable measures it should be ensured that after the direct foaming on of the supporting part 7 onto the barrier film 60, a sufficient passage of air is brought about in the direction of the covering material 44 or of the flameproofing layer 36. This may take place by melting on or milling off the intermediate layer 59. If a barrier film of high-strength fibers is arranged in addition to this fluid- or moisture-tight barrier film 60, then this barrier film of high-strength fibers may also be removed in the region of the perforations with larger openings, for example by cutting out or separating individual springs or lattice parts, in order to achieve a greater permeability by air in the direction of the caverns formed in the flameproofing layer 36 consisting of open-celled plastics foam.

Figure 9:
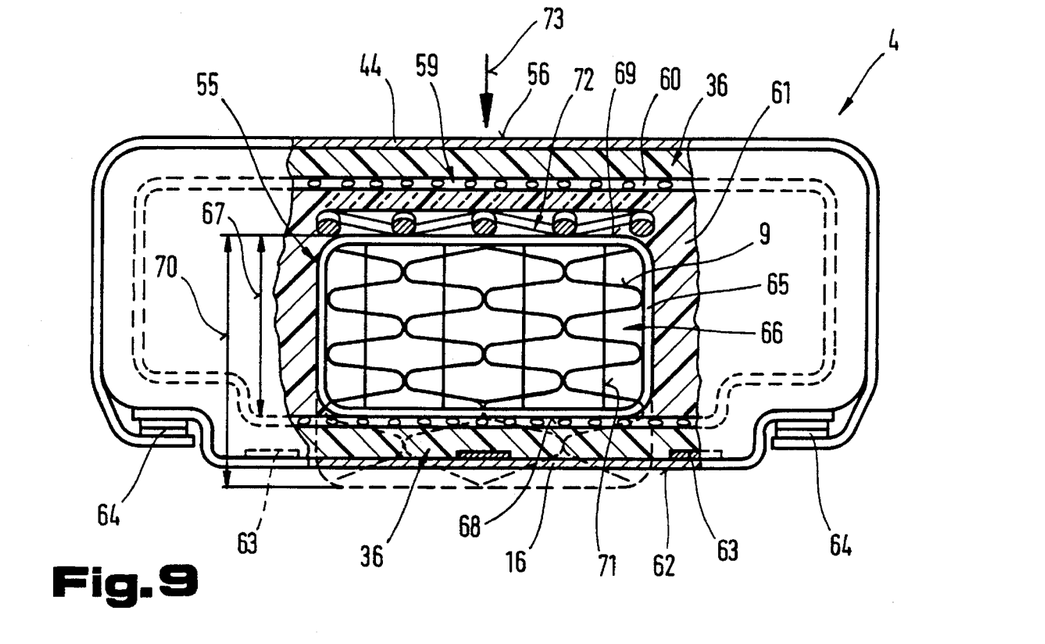
FIG. 9 shows a seat cushion in accordance with a fifth embodiment, in front view, partially in section.

In FIG. 9 a further embodiment is illustrated, in which the same reference numbers are used for the same parts as in the preceding figures.

The seat cushion 4 of FIG. 9 again comprises the flameproof covering materials 16, 44, a flameproofing layer 36, an intermediate layer 49 and a supporting body 61. The flameproof covering material 16 is connected on a rear face 62 of the seat cushion 4 via an adhesive 63 with the flameproofing layer 36, whilst the part of the covering material 44 facing the sitting surface 56 is exchangeable by means of burred tapes 64.

In the interior of the supporting body 61, produced from a plastics foam mixed with solid flame retardants, a spring core 9 is foamed in as supporting device 55. Whilst in the previously described embodiments, the plastics foam of the supporting body 61 entirely penetrates the spring core 9, in this embodiment, the supporting device 55 is surrounded by a plastics film 65 or is encased therein. The plastics film 65 is air-tight and is also secured with air-tight welds, so that it acts as an air cushion 66 with the supporting device 55 embedded therein. In the case of a loading of the supporting device 55, i.e. the spring core 9, the air in the air cushion 66 is more highly condensed and the seat, after being relieved of the load returns into its original position again through the action of the spring core 9. The advantage of this embodiment lies above all in that a volume of air is created in the supporting body 61, so that the seat cushion 4 can be used to a limited extent as a float. It is only important here that the buoyancy of the seat cushion 4 is so great that a person moving in the water receives sufficient buoyancy to keep himself above water.

The supporting device 55, arranged in the supporting body 61, for example the spring core 9, serves to increase the lifespan and to alter the spring characteristic of the seat cushion 4. In order now to be able to match the spring characteristics to particular requirements, the height 67 of the supporting device 55 between base surface 68 and cover surface 69 in a layer foamed into the supporting body 61 is smaller than the thickness 70 of the supporting device 55 or of the spring core 9 in its unstressed state. This prestressing is achieved in that the base surface 68 and the cover surface 69 are spaced apart from each other by means of bracing elements 71, the length of which, running vertically to the base surface 68, is smaller than the thickness 70 of the unstressed spring core 9. It is thus possible to prestress the supporting device 55, i.e. the spring core 9, to any desired extent, so that the spring characteristics of such a seat cushion 4 can be altered in any desired manner.

In this embodiment the cover surface 69 is covered by an intermediate layer 72. Such an intermediate layer may be placed directly onto the cover surface 69. A thicker layer can thus be achieved, and through this a uniform distribution of the load onto the entire spring core 9, without parts of the spring core 9 being felt by the user as intrusive pressure sites. Such an intermediate layer 72 may consist of a network, lattice, knitted fabric or the like, of wire or of glass fibers, preferably a lattice which has a correspondingly high inherent rigidity, so that it can span the cover surface 69 in the manner of a bridge, in order to make possible a sufficient load distribution over the entire cover surface 69 of the spring core 9.

In addition, in this embodiment, the density of the plastics foam of the supporting body 61 may be higher in the region between the cover surface 69 of the supporting device 55 and the intermediate layer 59, than in the remaining regions of the supporting body 61. This is indicated diagrammatically by denser shading of the region between the cover surface 69 and the intermediate layer 59. The loads which act on the seat cushion 4 in the direction of load—arrow 73—can thus be distributed uniformly over the spring core 9. Through the greater hardness of a denser foam material of the supporting body 61, a type of resilient insert plate is created, which distributes loads, acting partially in a punctiform manner, by the person sitting on the seat, uniformly onto the spring core 9. Thereby, pressure sites by individual parts of the spring core 9 are avoided.

This increase in the density of the foam material of the supporting body 61 in the region above the spring core 9 may be achieved by the intermediate layer 72 which leads to a more rapid cooling of the plastic foam and hence to a higher density. However, it is also possible, through corresponding temperature controls, to accelerate hardening in this region of the mould in the production of the supporting body 61, to achieve higher density or the formation of a thicker skin. This thicker skin has the advantage that it has a higher number of closed cells.

Figure 10:
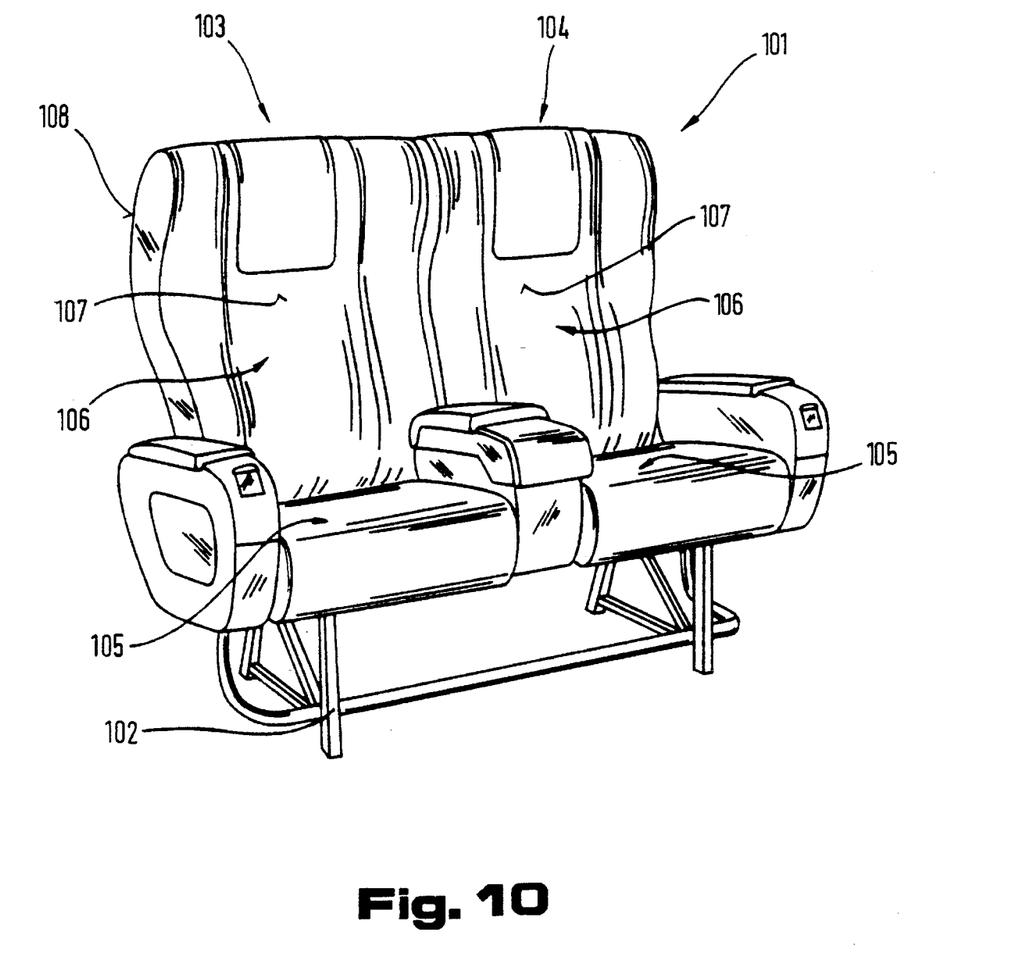
FIG. 10 shows a bench seat, as usually used in aircraft, with a seat cushion constructed according to the invention, in simplified, schematic, diagrammatic representation.

In FIG. 10, a bench seat 101 is shown, in particular for use in a passenger aircraft, but which is also suitable in a similar manner for example for railways, in particular for long-distance trains or the like. this bench seat 101 consists of a supporting frame 102 and two seats 103 and 104 arranged thereon. Each of the seats 103 and 104 is produced from a seat cushion 105, forming a sitting surface, and a seat cushion 106 forming a back rest. The seat cushion 106 has a surface 107 facing a user and a rear surface 108 facing away therefrom. The seat cushions 105 and 106 are usually inserted into the supporting frame 102 and are fixed thereon if necessary with burred tapes and the like.

Figure 11:
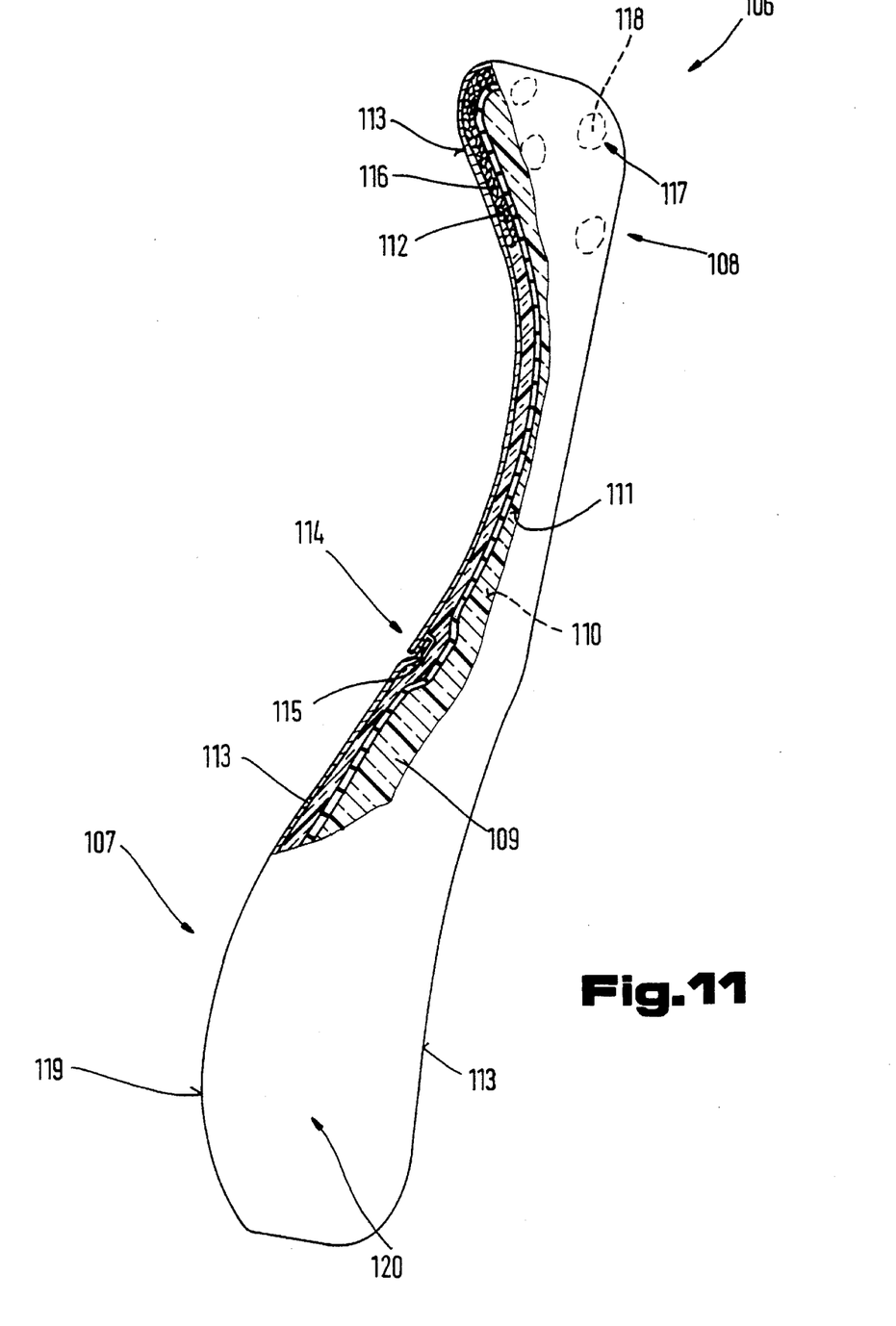
FIG. 11 shows a seat back cushion according to a sixth embodiment of the invention, in side view, partially in section.

In FIG. 11, the seat cushion 106, forming the back rest, is shown on an enlarged scale. The seat cushion consists of a supporting body 109 of plastics foam 111, mixed if necessary with flame-retardant materials 110, which is usually constructed so as to be open-celled or with a large proportion of open cells. This supporting body 109 is encased in a flame-resistant protective layer 112. A casing of a covering material 113 is placed over protective layer 112, which casing of covering material 113 may be attached if necessary by means of a detachable connecting device 114, e.g. burred tapes 115, to protective layer 112. However, it is also possible to arrange between the material protective layer 112 and the covering 113 a flameproofing layer 116 of an open-celled, resilient foamed plastic with a lower density than the supporting body 109. This flameproofing layer 116 is, however, not obligatory and may also be entirely eliminated depending on the case of application. The protective layer 112, as shown diagrammatically in the upper region of the seat cushion 106, is bonded to the supporting body 109 with layers 117 of adhesive 118 distributed over the surface. One part of protective layer 112 may extend here in a seamless manner from the rear surface 108 into the region of a lateral edge 119 between the surface 107 and lateral faces 120. The protective layer in the region of the surface 107 may then be formed by a further material part. On the other hand, however, it is likewise also possible to arrange the part of the material protective layer 112, forming the surface 107 over the lateral faces 120 into the region of the rear surface 108, and to provide the joint between the material parts of the protective layer 112 between the lateral faces 120 and the rear face 108. The position of the plane of separation is preferably established as a function of the desired deformation behaviour of the seat cushion 106 and the mechanical stresses owing to the construction of the supporting frame 102 for the seat cushion 106, and can be arranged accordingly, as desired.

Of course, the embodiments described for the seat cushion 105 may also be used for the production of the seat cushion 105 and the statements made hitherto and the subsequent embodiments also apply to the seat cushion 105 in an identical manner.

Figure 12:
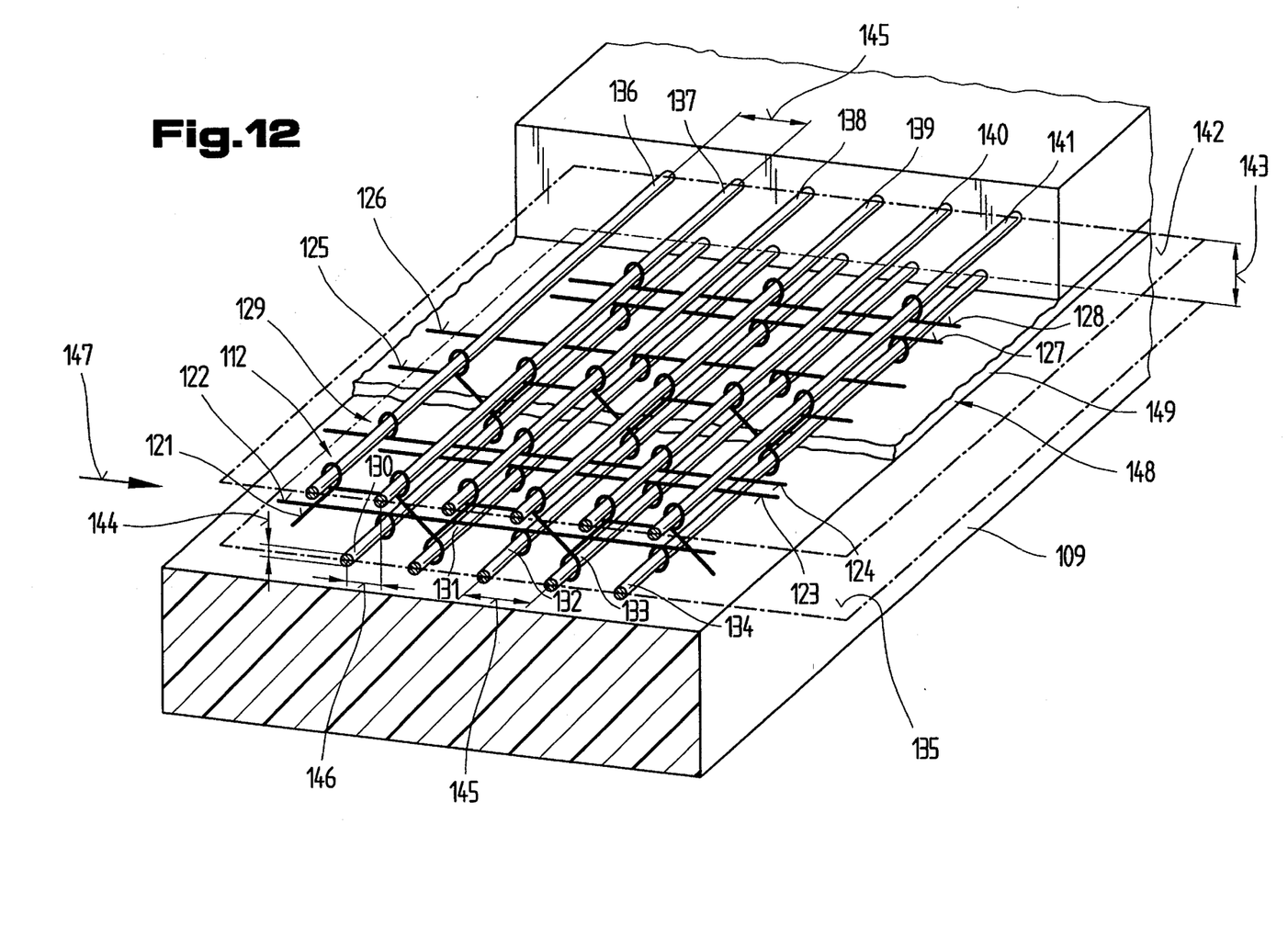
FIG. 12 shows the structure of the material protective layer and its integration into the overall structure of a seat cushion according to the invention in a greatly simplified, diagrammatic representation.
Figures 19, 20:
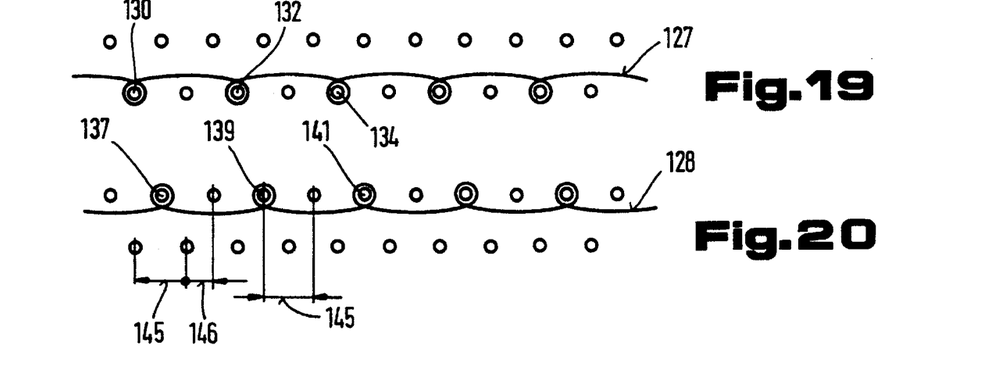

In FIG. 12 the machine-knitted, multi-layered material of protective layer 112 is illustrated diagrammatically As shown, the material comprises warp threads 130 to 134 and 136 to 141 arranged in two superposed planes 135 and 142 indicated by phantom lines and spaced from each other by a distance 143. The warp threads are spaced apart a uniform predetermined distance 145 (see FIG. 20), and warp threads 136 to 141 in upper plane 142 are staggered in a woof direction, indicated by arrow 147, by half the predetermined distance 146 (FIG. 20) from warp threads 130 to 133 in lower plane 135. The warp threads extend in a longitudinal direction.

The two planes 135 and 142 are spaced apart from each other vertically by a distance 143, which corresponds at least to the thickness 144 of one of the warp threads 130 to 134 and 136 to 141.

The material of protective layer 112 further comprises weft thread groups 129 arranged in the required number one after the other in the longitudinal direction of the warp threads 130 to 134 and 136 to 141.

Each group 129 is comprised of eight weft threads 121 to 128 adjacent each other in the longitudinal direction. Two weft threads 121, 125 are looped around each warp thread 136 to 141 in upper plane 142, and these weft threads are additionally looped around alternating warp threads 130 to 134 in lower plane 135, i.e. weft thread 121 is looped around warp threads 131 and 133 and weft thread 125 is looped around warp threads 130, 132 and 134. Three weft threads 1.22, 123, 124 of the six additional weft threads 122 to 124 and 126 to 128 are arranged between the two weft threads 121 and 125 and are looped around different warp threads arranged only in one of the planes 135, 142. Each warp thread 130 to 134 and 136 to 141 is loped around by only three weft threads, as can be clearly seen in FIG. 12.

Figure 13:
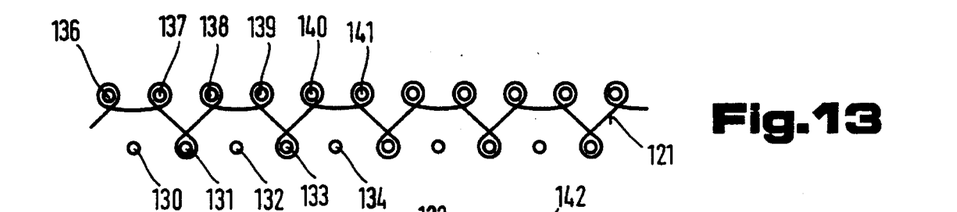
FIGS. 13 to 20 show in schematic cross sectional front view, various paths of weft threads around the warp threads, arranged in several planes, of material protective layers which can be used in seat cushions according to the invention.
Figure 14:
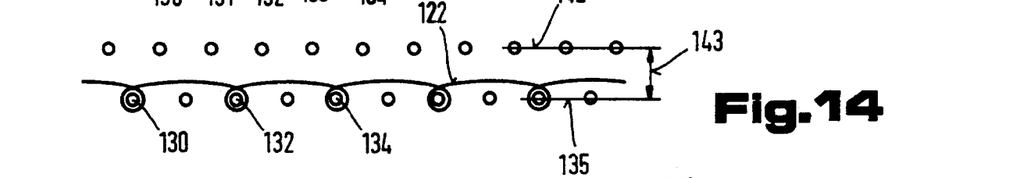
Figures 15, 16:
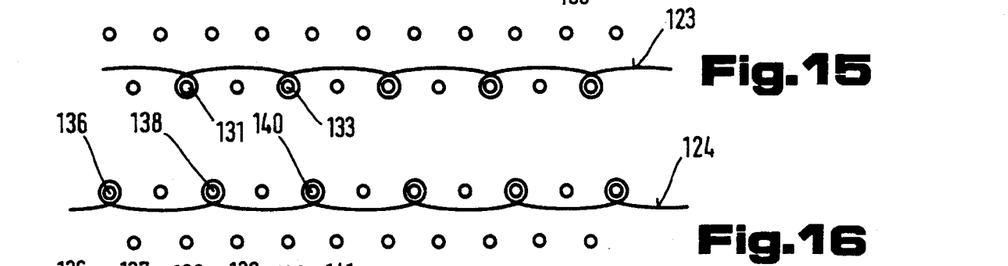
Figure 17:
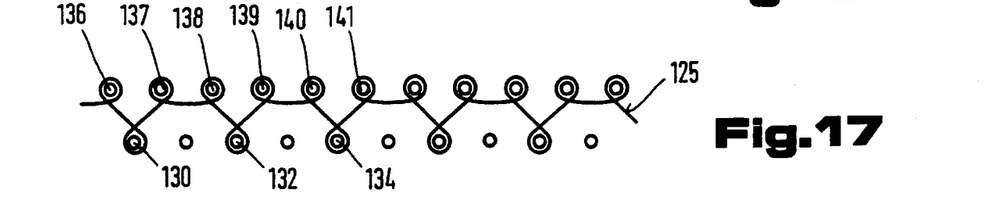
Figure 18:
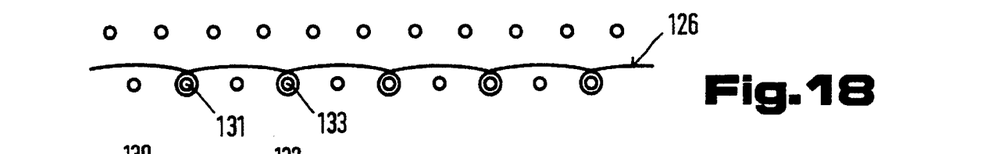

The end views of FIGS. 13 to 20 clearly illustrate the paths of weft threads 121 to 128. As shown in FIGS. 13 and 17, weft threads 121 and 125 are looped around each warp thread 136 to 141 in upper plane 142, weft thread 121 is looped around warp threads 131 and 133 in lower plane 135 and weft thread 125 is looped around alternating warp threads 130, 132 and 134 in the lower plane. Weft threads 122, 123 and 124 are arranged between weft threads 121 and 125. Weft thread 122 adjacent weft thread 121 (FIG. 14) is looped around warp threads 130, 132 and 134 in lower plane 135 around which one weft thread 121 is not looped. Weft thread 123 adjacent weft thread 122 (FIG. 15) is looped around only those warp threads 131, 133 in lower plane 135 around which weft thread 121 is looped. Weft thread 124 adjacent weft thread 123 (FIG. 16) is looped around only alternating warp threads 136, 138 and 140 in upper plane 142. Weft thread 126 adjacent weft thread 125 (FIG. 18) is looped around warp threads 131, 133 in lower plane 135 around which weft thread 125 is not looped. Weft thread 127 adjacent weft thread 124 (FIG. 19) is looped around only those warp threads 130, 132 and 134 in lower plane 135 around which weft thread 125 is looped, and weft thread 128 adjacent weft thread 127 (FIG. 20) is looped around only alternating warp threads 137, 139 and 141 in upper plane 142.

Weft thread groups 129 are arranged recurrently over the entire length of the material of protective layer 112. A layer 148 of adhesive 149 bonds protective layer 112 over its entire surface to supporting body 109, and the adhesive fixes the threads of the protective layer material on the supporting body in a prestressed state.

Figure 21:
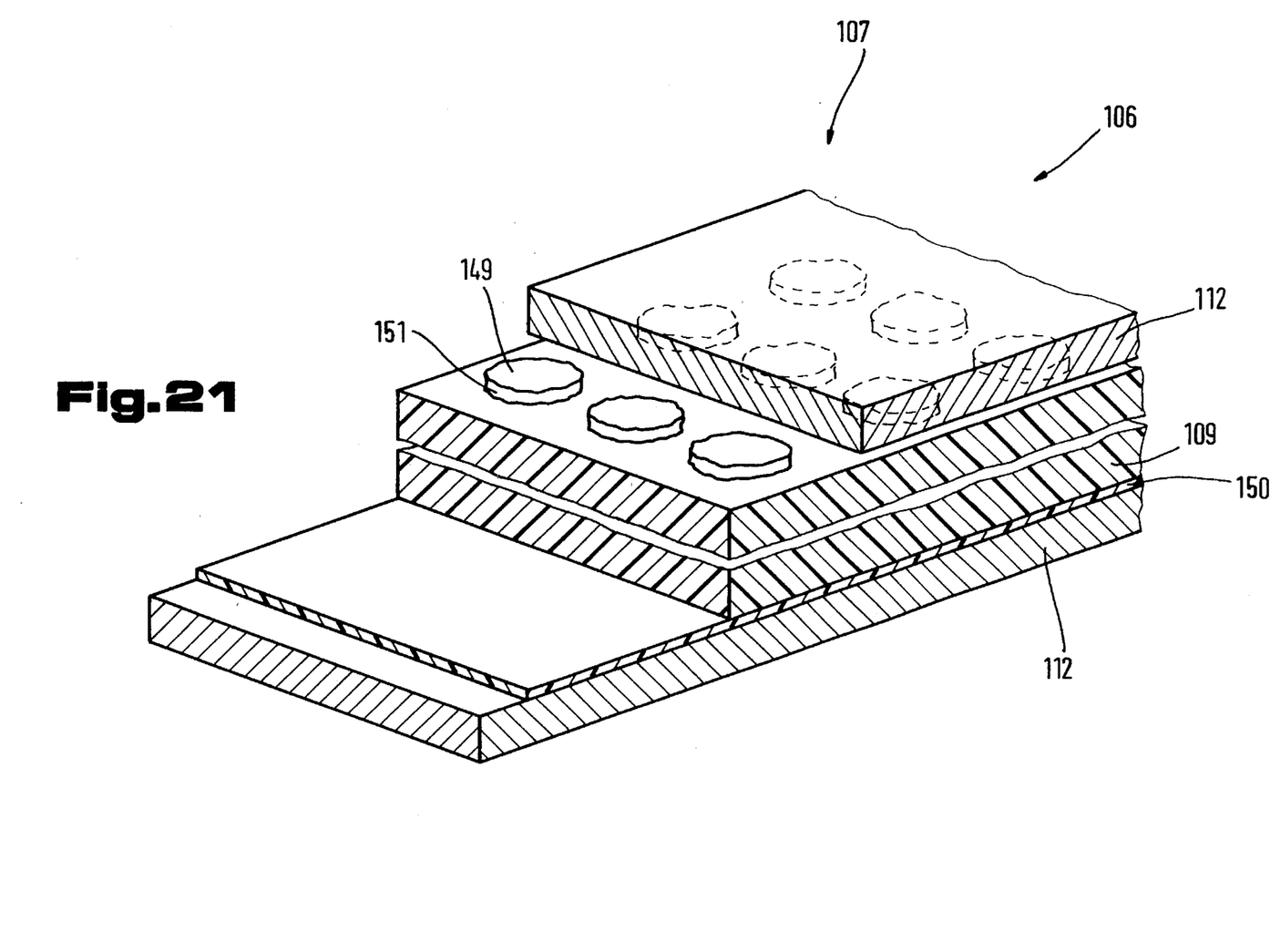
FIG. 21 shows a further embodiment of a seat cushion according to the invention, in simplified schematic representation.

In FIG. 21 a variant embodiment of the seat cushion 106 is shown, in which the individual layers are indicated diagrammatically by blocks.

It can be seen from this illustration, that onto a protective layer 112, with the interposition of a film 150, for example a polyethylene- or polyurethane (PU) film, which may be coated in molten condition on the protective layer, the supporting body 109 is foamed on protective layer 112. On the surface of the supporting body 109, facing away from the film 150, another protective layer 112 is then bonded by layers 151 of adhesive 149, which are distributed over the surface of the supporting body 109 and spaced from each other, which protective layer 112 forms the surface 107 of the seat cushion 106 facing the user.

The advantage of this layered structure and the connection of the individual layers with each other lies in that the manufacturing process can be simplified through the foaming on of the supporting body 109 onto the protective layer 112, whereas the comfort of the seat cushion 106 when in use is not impaired, because the protective layer 112, facing the user, is given a high degree of permeability by air, via attachment regions spaced from each other through the adhesive 149, in the region of the protective layer 112, and therefore in the case of a compression of the supporting body 109 by the user leaning against the seat cushion 106, the air can escape and hence the elasticity of the supporting body 109 and of the protective layer 112 can be utilized to the full. If, in fact, the further protective layer 112 were formed by a foaming process on the supporting body 109, then the seat cushion 106 would act as an air balloon and would be felt as a hard body, whereby the sitting comfort of the seat cushion 106 is lost.

Any other desired combinations of the individual features previously described may form in each case individual solutions, independent in themselves, in accordance with the invention. Furthermore, it is pointed out that in the partially diagrammatic illustrations of the seat cushions according to the invention, the individual layers and plies were illustrated in a distorted and disproportionate manner with regard to scale, in order to illustrate the construction more clearly. Above all, the thread thicknesses of the individual weft- and warp threads 121 to 128, 130 to 134 and 136 to 141 were greatly exaggerated as regards scale and the individual threads were illustrated in a distorted manner with regard to their spacing in their position in longitudinal direction of the warp threads, for the purpose of better illustration.

What is claimed is:

1. In combination with a vehicle seat, a seat cushion comprising (a) a supporting body of an open-celled, resilient foamed plastic material, (b) an outer flame-resistant covering material encasing at least portions of the seat cushion, and (c) a flame-resistant protective layer encasing the supporting body and connected thereto, the protective layer underlying the covering material and consisting of machine-knitted, multi-layered material comprising (1) warp threads arranged in two superposed planes and being spaced apart a predetermined distance, the warp threads in an upper one of the planes being staggered in a woof direction by half the predetermined distance from the warp threads in a lower one of the planes, and the warp threads extending in a longitudinal direction, and (2) a group of eight weft threads adjacent each other in the longitudinal direction, two of the eight weft threads being looped around each warp thread in the upper plane, a respective one of the two weft threads being additionally looped around alternating ones of the warp threads in the lower plane, three of the six additional weft threads being arranged between the two weft threads and being looped around different warp threads arranged only in one of the two planes, and each warp thread in each plane being looped around by only three of said weft threads.

2. The seat cushion of claim 1, wherein the vehicle is an aircraft.

3. The seat cushion of claim 1, further comprising means detachably connecting the covering material to the seat cushion.

4. The seat cushion of claim 1, wherein a first one of the three weft threads adjacent one of the two weft threads is looped around the warp threads in the lower plane around which the one weft thread is not looped, a second one of the three weft threads adjacent the first weft thread is looped around only those warp threads in the lower plane around which the one weft thread is looped, a third one of the three weft threads adjacent the second weft thread is looped around only alternating ones of the warp threads in the upper plane, a fourth one of the six additional weft threads adjacent the other one of the two weft threads is looped around the warp threads in the lower plane around which the other weft thread is not looped, a fifth one of the six additional weft threads adjacent the fourth weft thread is looped around only those warp threads in the lower plane around which the other weft thread is looped, and a sixth one of the six additional weft threads adjacent the fifth weft thread is looped around only alternating ones of the warp threads in the upper plane.

5. The seat cushion of claim 1, wherein the weft threads looped around the warp threads in the two planes extend between the warp threads arranged in the two planes.

6. The seat cushion of claim 1, wherein the lower plane of the protective layer material faces the supporting body.

7. The seat cushion of claim 1, wherein at least some of the threads are formed of polyamide fibers.

8. The seat cushion of claim 7, wherein the polyamide is a polyaromatic amide.

9. The seat cushion of claim 1, wherein the threads are coated with a synthetic resin material.

10. The seat cushion of claim 9, wherein the synthetic resin material is a synthetic resin selected from the group consisting of polyvinylchloride and polyurethane.

11. The seat cushion of claim 1, wherein a portion of the threads are formed of preoxidized polyacrylonitrile and another portion of the threads is formed of polyamide.

12. The seat cushion of claim 11, wherein the polyamide is a polyaromatic amide.

13. The seat cushion of claim 11, wherein the portion of preoxidized polyacrylonitrile threads is 30% and the other portion of polyamide threads is 70%.

14. The seat cushion of claim 1, wherein the threads are slightly twisted.

15. The seat cushion of claim 1, further comprising an adhesive bonding at least portions of the protective layer to the supporting body, the adhesive fixing the threads on the supporting body in a prestressed state.

16. The seat cushion of claim 1, wherein the supporting body is foamed onto a surface of the protective layer and thereby bonded thereto, the surface facing away from a user of the cushion seat.

17. The seat cushion of claim 16, further comprising a fluid-tight film interposed between the protective layer and the supporting body.

18. The seat cushion of claim 16, further comprising a further protective layer bonded to a surface of the supporting body, the surface facing a user of the cushion seat.

19. The seat cushion of claim 18, further comprising an air-permeable adhesive layer bonding the further protective layer to the surface of the supporting body.

20. The seat cushion of claim 1, further comprising a flame-proofing layer of an open-celled, elastic plastic material interposed between the supporting body and the protective layer, the plastic material having a different density than the supporting body.

21. The seat cushion of claim 20, wherein the flameproofing layer is laminated to a surface of the protective layer facing away from the supporting body.

* * * * *